United States Patent [19]

Cresko et al.

[11] 4,180,847

[45] Dec. 25, 1979

[54] LIGHTING DISPLAY INSENSITIVE TO EXTRANEOUS LIGHT

[75] Inventors: Joseph V. Cresko, Tunkhannock; John A. Moore, South Montrose, both of Pa.

[73] Assignee: The Bendix Corporation, Teterboro, N.J.

[21] Appl. No.: 939,150

[22] Filed: Sep. 1, 1978

[51] Int. Cl.[2] .......... G01D 11/28

[52] U.S. Cl. .......... 362/30; 362/29; 362/32; 362/293; 362/311

[58] Field of Search .......... 362/29, 30, 32, 293, 362/311

[56] References Cited

U.S. PATENT DOCUMENTS

| | | | |
|---|---|---|---|
| 3,120,349 | 2/1964 | Howland | 362/30 |
| 4,128,859 | 12/1978 | Rietmüller | 362/32 X |

*Primary Examiner*—Stephen J. Jr. Lechert

*Attorney, Agent, or Firm*—Anthony F. Cuoco; William F. Thornton

[57] ABSTRACT

For use with a lighted display which must be seen while energized in a high brightness environment, an arrangement which prevents extraneous light from entering the display for precluding ambiguity to a viewer as to whether or not the display is energized.

7 Claims, 2 Drawing Figures

LIGHTING DISPLAY INSENSITIVE TO EXTRANEOUS LIGHT

FIELD OF THE INVENTION

This invention relates to lighted displays such as flight condition annunciators or the like. More particularly, this invention relates to lighted displays of the type described which must be rendered insensitive to extraneous light so as to be seen while energized in a high brightness environment and yet be non-ambiguous to the viewer as to whether or not they are energized.

DESCRIPTION OF THE PRIOR ART

Flight condition indicators or the like such as installed in aircraft instrument panels usually include annunciators for annuciating predetermined flight conditions. The annunciators are in the form of lighted displays. It is frequently necessary that the annunciators be used in a high brightness environment, i.e., they are exposed to direct sunlight or the like when energized to annunciate the predetermined flight conditions. When the annunciators are not energized, it is necessary that they do not give the false appearance of being so energized, i.e., they must not present to the viewer an ambiguity as to whether or not they are energized.

Prior to the present invention several means have been used to accomplish the aforenoted purpose. In one such means, a light coat of black paint has been applied on the viewing surface of the lighted display to absorb extraneous light as will be understood by those skilled in the art. Likewise, circular polarizers have been used to prevent extraneous light (sunlight) from reflecting on the display. However, both of the aforenoted means tend to absorb light from the energized display, thus reducing its brightness and making it more difficult to see in a high brightness environment. It is therefore a main object of this invention to provide a lighted display which can be readily seen when energized in a high brightness environment without reducing the display brightness, and to prevent ambiguities as to whether or not the display is energized.

SUMMARY OF THE INVENTION

This invention contemplates a lighted display for accomplishing the purposes described by using a light pipe with a matte viewing surface. Extraneous light is scattered by the matte surface thereby minimizing the amount of such light traveling back through the light pipe. Extraneous light that does enter the display is further reduced in traveling through an arrangement including a filter, lens and lamp. The arrangement is such that the amount of extraneous light entering the display and reflected in the direction of the viewer is a small fraction of that which falls upon the viewing surface, thus making the display essentially non-reflecting. Light emanating from the energized lamp is focused on a polished end of the light pipe opposite the matte end so that when the display is energized, light is transmitted efficiently to the matte surface which diffuses the light, enhancing its viewing angle.

DESCRIPTION OF THE INVENTION

Figure 1:
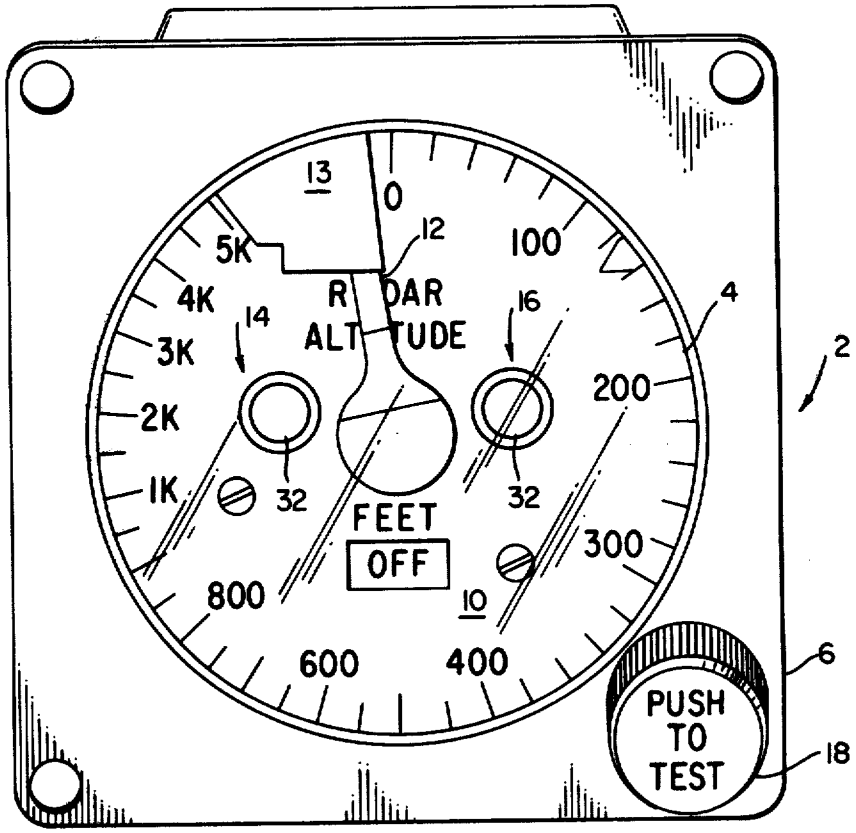
FIG. 1 is a pictorial representation of a flight condition indicator employing a lighted display in accordance with the invention.

With reference first to FIG. 1, the invention is shown, for purposes of illustration, as utilized with a radar altimeter designated generally by the numeral 2. Radar altimeter 2 is of a type well known in the art and includes an indicating dial 4 suitably secured in bezel 6. A cover glass 10 may be disposed in front of the dial as shown in the Figure.

On either side of an indicator needle 12, partially hidden by a mask 13, are shown annunciator lights 14 and 16. For purposes of illustration, annunciator light 14 may be energized so as to provide a red light when a predetermined low altitude has been reached and annunciator light 16 may be energized to provide a green light when altimeter 2 is rendered in a self-test mode as by actuating a "push to test" button 18. Annunciator lights 14 and 16 incorporate the device of the invention as illustrated in FIG. 2 and as will be next described.

Figure 2:
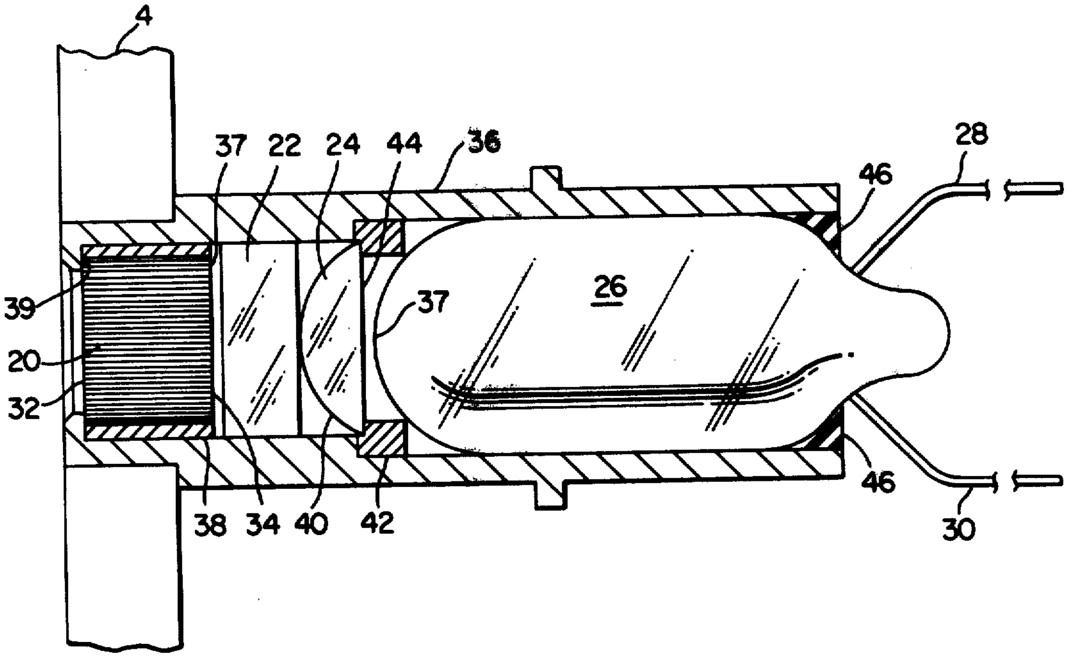
FIG. 2 is a schematic side view representation showing means for rendering a lighted display insensitive to extraneous light in accordance with the invention.

As shown in FIG. 2, the basic components of annunciators 14 and 16 include a light pipe 20, a transparent color filter 22, a focusing lens 24, and a light source such as a conventional incandescent lamp 26 having connectors 28 and 30 extending therefrom for connection to a suitable energizing source (not shown).

Light pipe 20 has a matte finish applied to a viewing surface 32 thereof, such as by liquid honing or the like, with an opposite surface 34 of the light pipe being highly polished. In this connection it is noted that light pipe 20 may be a solid rod or bar of glass or acrylic, but in the preferred embodiment of the invention, is a fiber optics bundle fabricated as is well known in the fiber optics art, wherein the optical fibers are cemented in a thin walled tubing 38. Light pipe 20 is disposed within a casing 36 so that tubing 38 abuts an internal flange 39 of the casing.

Filter 22 is disposed within casing 36 with one end in slight spaced relation with polished surface 34 of light pipe 20 to provide an air gap 37 of 0.010–0.015 inches, while focusing lens 24 is disposed within the casing and has a convex surface 40 adjacent the opposite end of filter 22.

The noted space or air gap between light pipe 20 and filter 22 is desirable so that when lamp 26 is not energized and there is a bright light falling on face 32 of light pipe 20, some of the color from filter 22 bleeds back through the light pipe and becomes visible. A snap ring 42 receives planar surface 44 of focusing lens 24. Snap ring 42, filter 22 and tubing 38 are suitably secured within housing 36 as by cementing or the like so that light pipe 20, filter 22 and focusing lens 24 are maintained in the appropriate longitudinal position as shown in the Figure an as will be understood by those skilled in the art.

Lamp 26 is disposed within housing 36 so that its light emitting end 37 is in slight spaced relation with planar surface 44 of focusing lens 24. The space between the opposite end of the lamp and housing 36, at 46, is filled with silicon rubber cement, or the like, for light sealing purposes as will be understood by those skilled in the art. Housing 36 is arranged with annunciators 14 and 16 so as to be flush with dial 4 as illustrated in FIGS. 1 and 2.

OPERATION OF THE INVENTION

Matte surface 32 of light pipe 20 and the structural arrangement as shown and described with reference to FIG. 2, has the purpose of scattering extraneous light thereby greatly reducing the amount of light traveling back through the light pipe to affect the unlighted annunciator. Any extraneous light that does enter the display is further reduced due to its traveling through filter 22, lens 24 and finally lamp 26.

In this connection it will be understood that for the implementation described, the total length of the assembly shown in FIG. 2 is approximately 0.825 inches, with light pipe 20 being approximately 0.197 inches in diameter. Characteristically, extraneous light, in order to be reflected back to the viewer must enter the light pipe at an angle not exceeding approximately 42° from the longitudinal axis of the pipe. Therefore, the amount of light which enters the display and is reflected back in the direction of the viewer is a fraction of that which falls upon the display from the front of the annunciator (viewing surface 32).

The display is therefore essentially non-reflecting. Light emanating from the energized display from lamp 26 is focused through focusing lens 20 to polished surface 34 of light pipe 20 so that when the display is energized light is transmitted efficiently to matte surface 32 of the light pipe. The light thus received at surface 32 is diffused and its viewing angle is enhanced. The light also has a high brightness level which makes it visible in a high brightness environment.

It will now be seen from the aforegoing description of the invention that a lighted display having non-ambiguous characteristics under energized and non-energized conditions has been provided. The lighted display may be seen while energized in a high brightness environment and when not energized does not suffer the disadvantage of giving the false appearance of being energized. Thus the invention has particular use in aircraft instrument displays and the like as heretofore noted, and particularly such displays which are exposed to extraneous light such as sunlight or the like.

What is claimed is:

1. Lighting display apparatus insensitive to extraneous light comprising:

a housing;

means disposed in the housing and arranged to be energized for emitting light;

light transmitting means arranged in the housing and including a viewing surface having a matte finish and a highly polished surface opposite the viewing surface;

means arranged in the housing intermediate the light emitting means and the opposite surface of the light transmitting means for carrying the light emitted by the light emitting means to the light transmitting means for transmission therethrough; and the matte finish of the viewing surface of the light transmitting means being effective for diffusing extraneous light so as to minimize such light entering the display apparatus and reflected in the direction of the viewer, and the highly polished opposite surface of the light transmitting means being effective for efficiently transmitting light through said means.

2. Apparatus as described by claim 1, wherein:

the light transmitting means is a light pipe, with the viewing surface having a matte finish being one end of the light pipe; and the highly polished surface opposite the viewing surface being the other end of the light pipe.

3. Apparatus as described by claim 1, wherein:

the means arranged in the housing intermediate the light emitting means and the opposite surface of the light transmitting means for carrying the light emitted by the light emitting means to the light transmitting means for transmission therethrough includes:

a light filter having one end in spaced relation with the highly polished surface of the light pipe; and a focusing lens having a convex surface adjacent the end of the filter opposite the one end, and having a planar surface in spaced relation with the light emitting means.

4. Apparatus as described by claim 3, wherein: the light emitting means is disposed to extend longitudinally within the housing, with one end thereof emitting light and being in spaced relation with the planar surface of the focusing lens; and the opposite end of the light emitting means arranged in light sealing fashion within the housing.

5. Apparatus as described by claim 3, wherein:

the light filter is a transparent color filter.

6. Apparatus as described by claim 2, wherein:

the light pipe is a solid light transmitting rod.

7. Apparatus as described by claim 2, wherein:

the light pipe is a fiber optics bundle.

* * * * *